US010269092B2

(12) United States Patent
Yoshimi

(10) Patent No.: US 10,269,092 B2
(45) Date of Patent: Apr. 23, 2019

(54) IMAGE PROCESSING DEVICE, IMAGE PROCESSING METHOD, AND STORAGE MEDIUM

(71) Applicant: NEC Corporation, Tokyo (JP)

(72) Inventor: Kosuke Yoshimi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/753,741

(22) PCT Filed: Jun. 13, 2017

(86) PCT No.: PCT/JP2017/021824
§ 371 (c)(1),
(2) Date: Feb. 20, 2018

(87) PCT Pub. No.: WO2017/217411
PCT Pub. Date: Dec. 21, 2017

(65) Prior Publication Data
US 2019/0012766 A1 Jan. 10, 2019

(30) Foreign Application Priority Data
Jun. 17, 2016 (JP) .................................. 2016-120984

(51) Int. Cl.
G06T 3/00 (2006.01)
G06T 5/00 (2006.01)
(Continued)

(52) U.S. Cl.
CPC ............ *G06T 3/0018* (2013.01); *G02B 13/06* (2013.01); *G02B 27/0037* (2013.01); *G06T 5/003* (2013.01)

(58) Field of Classification Search
CPC ....... G06T 3/0018; G06T 5/003; G06T 5/006; G02B 27/0037; G02B 13/06
See application file for complete search history.

(56) References Cited

U.S. PATENT DOCUMENTS 7,058,237 B2 * 6/2006 Liu .................... G06K 9/00228
345/660
2005/0259118 A1 * 11/2005 Mojaver .................. G06T 3/00
345/647
(Continued)

FOREIGN PATENT DOCUMENTS

JP 2005-086279 A 3/2005
JP 2007-249967 A 9/2007
(Continued)

OTHER PUBLICATIONS

Written Opinion of the International Search Report of PCT/JP2017/021824 dated Sep. 12, 2017.
(Continued)

Primary Examiner — Yon J Couso
(74) Attorney, Agent, or Firm — Sughrue Mion, PLLC

(57) ABSTRACT

The provided is an image processing device, an image processing method, and a program that can solve the above described problems and can normalize the distortion in the a fisheye image without being influenced by receiving the influence of the a fisheye optical system even when the positional relationship between the an optical axis of the a fisheye camera and the a plane to which the an object is grounded does not satisfy a certain conditions.
An image processing device 10 includes: a fisheye image acquisition unit 11 that acquires a fisheye image; a viewpoint compensation vector acquisition unit 12 that acquires, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object; and an image generation unit 13 that sets a plurality of viewpoints for a converted fisheye image that is the fisheye image converted using the viewpoint compensation vector, the plurality of viewpoints being parallel to the ground plane,
(Continued)

performs a distortion correction by perspective projection approximation based on a coordinate system axes of which include a line of sight from a viewpoint for each of the plurality of viewpoints, and generates a single normalized image using image elements of vertical direction, the image elements each extracted from corrected fisheye images.

15 Claims, 11 Drawing Sheets

(51) Int. Cl.
G02B 13/06 (2006.01)
G02B 27/00 (2006.01)

(56) References Cited

U.S. PATENT DOCUMENTS

2006/0056056 A1* 3/2006 Ahiska ............ G08B 13/19608
  359/690
2007/0211955 A1 9/2007 Pan et al.
2017/0347030 A1* 11/2017 Guerreiro .......... H04N 5/23238

FOREIGN PATENT DOCUMENTS

JP 4629131 B2 2/2011
JP 5569329 B2 8/2014

OTHER PUBLICATIONS

International Search Report of PCT/JP2017/021824 dated Sep. 12, 2017.

* cited by examiner

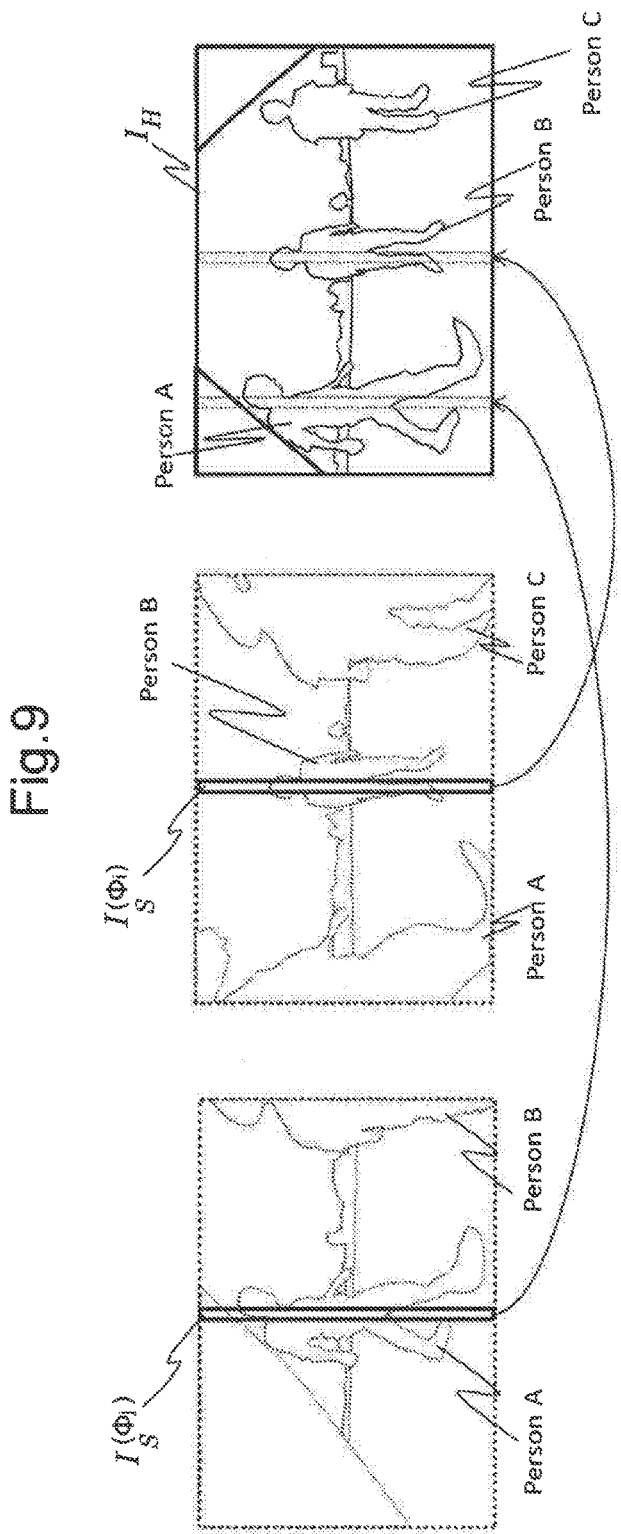

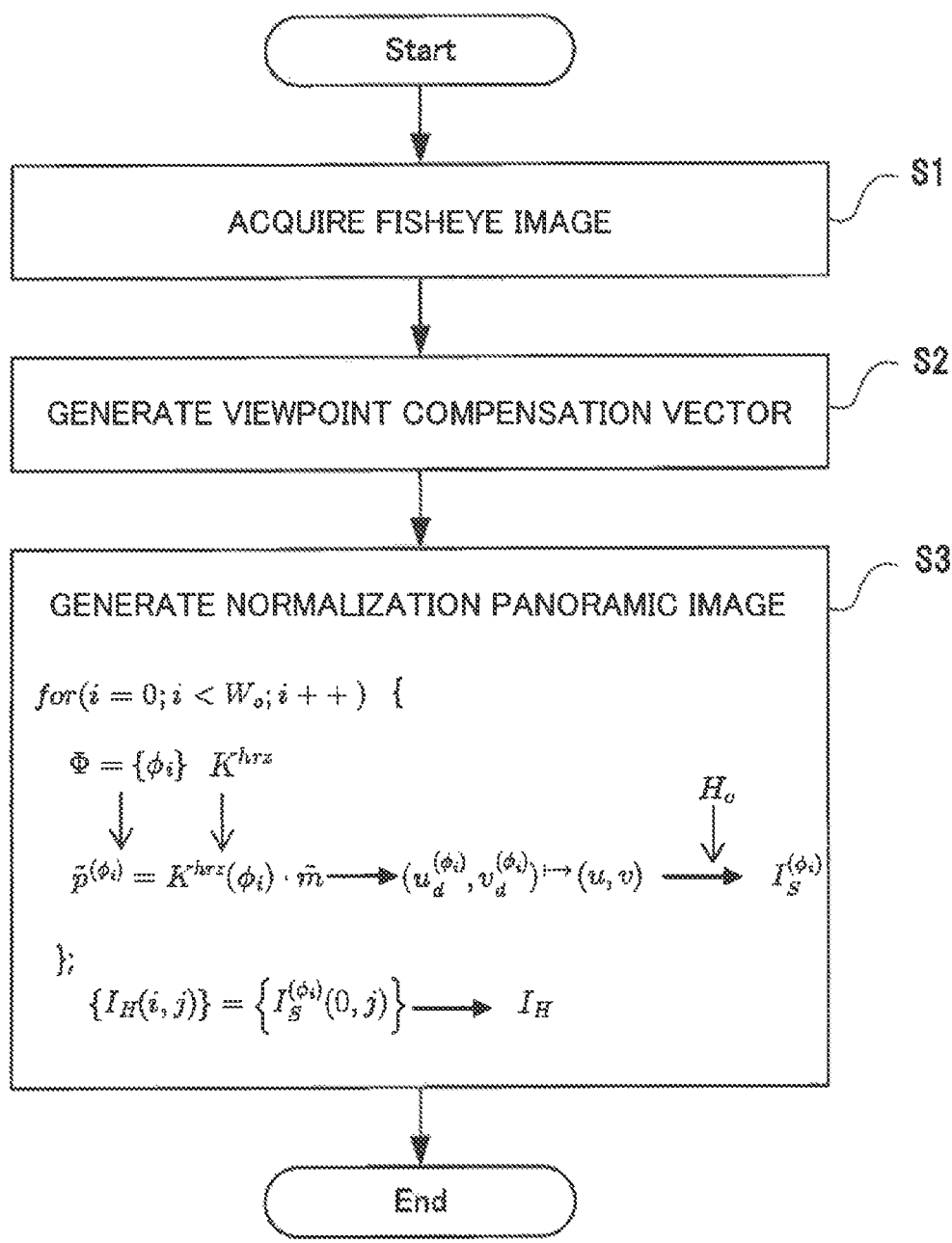

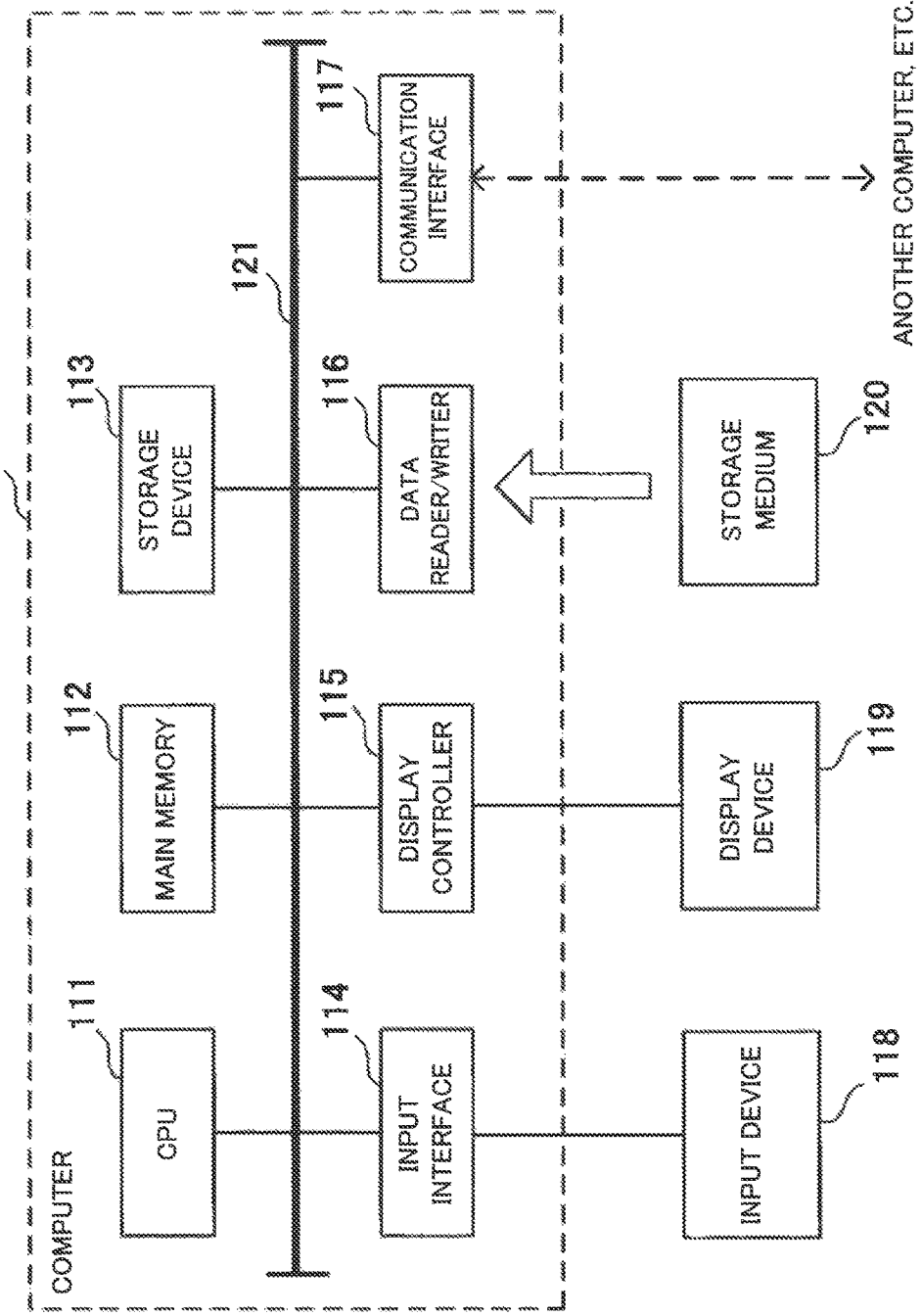

IMAGE PROCESSING DEVICE, IMAGE PROCESSING METHOD, AND STORAGE MEDIUM

CROSS REFERENCE TO RELATED APPLICATIONS

This application is a National Stage of International Application No. PCT/JP2017/021824 filed Jun. 13, 2017, claiming priority based on Japanese Patent Application No. 2016-120984 filed Jun. 17, 2016.

TECHNICAL FIELD

The present invention relates to an image processing device and an image processing method for conducting a normalization process to a fisheye image, and a storage medium storing a program for implementing the image processing device and the image processing method.

BACKGROUND ART

A fisheye camera has a feature that a single image having a wide viewing angle of more than 180 degrees can be taken and acquired, and because of this feature, the fisheye camera is used in an industrial field such as monitoring, a map generation, and an automotive rear-view monitor.

However, it is known that a fisheye camera generates a large optical distortion in a taken image. Therefore, if the fisheye camera is used in a task such as detecting a specific object such as a pedestrian in an image, the detection is sometimes difficult.

For example, as a detection method of the object, the detection methods by the machine learning using the statistical discriminator is generally known, but those are determination methods based on the similarity of a feature such as shape pattern of a pedestrian. Thus, it is difficult to apply the statistical identification that is designed on the assumption of an image taken by an ordinary camera (i.e. an optical system that can approximate a pinhole model and a perspective projection model) to a fisheye image in which the shape of the same object largely varies depending on a position in an image due to the optical distortion.

A method of correcting the optical distortion of a fisheye image and presenting a target in easily viewable way is proposed. This method includes modeling a fisheye image as mapping to the plane of the virtual image projected on the sphere surface, cutting out and converting a part of it into a corrected image (referred to as "perspective projection correction image") that approximates to an image taken according to the perspective projection model.

Although a straight line in a real space is restored as a straight line in the perspective projection correction image and the perspective projection correction image accurately approximates to a perspective projection camera image at a central part, the perspective projection correction image is an image in which an object is more unnaturally enlarged due to the projection distortion at a peripheral part as it is more peripheral. In the perspective projection correction image, it is not possible in principle to project an image from a viewpoint in any direction at an angle exceeding 90 degrees from an optical axis whose angle is 0 degree. Accordingly, the perspective projection correction image can be used only for a use application that requires only an image of a central part having small projection distortion.

To solve such problems, for example, PTL 1 and PTL 2 disclose a technology for correcting a distortion of a person and the like taken in a fisheye camera image.

Specifically, PTL 1 discloses an image converting device. The image converting device disclosed in PTL 1 models a fisheye image on a virtual sphere surface, projects it on a cylindrical coordinate system, generates a curved regular image, thereby correcting distortion. In the cylindrical coordinate system, a horizontal direction is set to be a tangential direction of a sphere surface and a vertical direction is set to be an axial direction of the sphere surface.

PTL 2 discloses an image presentation device using the image converting device disclosed in PTL 1. An image processing device disclosed in PTL 2 corrects, using the curved regular image disclosed in PTL 1, an image of a plurality of persons in a range of a view field extending in a horizontal direction from a central view field of the fisheye image.

CITATION LIST

Patent Literature

[PTL 1] Japanese Patent No. 4629131
[PTL 2] Japanese Patent No. 5569329

SUMMARY OF INVENTION

Technical Problem

By the way, in a system including a real fisheye camera, an optical axis of a camera is not necessarily in a positional relationship in which the optical axis of the camera is parallel to a plane to which the object is grounded or the optical axis of the camera make a right angle with the plane to which the object is grounded. Accordingly, in order to normalize an image of a pedestrian or the like which is an object, it is necessary to correct the difference between a direction vector that is parallel to the plane to which the object is grounded (target horizontal plane) and the vector of the optical axis of the camera.

However, the devices disclosed in above described PTL 1 and PTL 2 do not correct such difference between a direction vector and a vector of an optical axis, and thus, it is difficult to remove distortion from the real fisheye image.

Additionally, in the devices disclosed in above described PTL 1 and PTL 2 pixels on the fisheye image are represented by a simple expression of corresponding coordinates on the virtual sphere surface. In other words, these devices formulate the association of pixels on a fisheye image to a virtual sphere surface on assumption that a fisheye optical system pursuant to an ideal model.

However, there is a case where a design model of a general fisheye optical system is not open to the public, and in addition, a general fisheye optical system sometimes does not necessarily have optical properties pursuant to a model due to a deviation between the imaging device and the optical axis, distortion of the lens itself and the like. In other words, in a general fisheye optical system, there is a case where the ideal model is not formed. Especially, this tendency is remarkable in the in-vehicle and inexpensive fisheye camera or the like which is used for visually recognizing a rear view or a side view. As a result, in the devices disclosed in above described PTL 1 and PTL 2, even when it is not necessary to correct on the basis of a difference between the above described direction vector and the vector of the optical axis, there is a case where it is not easy to remove distortion from a fisheye image.

An objective of the present invention is to provide an image processing device, an image processing method, and a program that can solve the above described problems and can normalize distortion in a fisheye image without being influenced by a fisheye optical system even when positional relationship between an optical axis of a fisheye camera and a plane to which an object is grounded does not satisfy a certain condition.

Solution to Problem

In order to achieve above-described objective, an image processing device according to an aspect of the present invention includes: fisheye image acquisition means for acquiring a fisheye image in which an object is; viewpoint compensation vector acquisition means for acquiring, based on a roll angle around an optical axis of an imaging apparatus and a pitch angle of the optical axis, a viewpoint compensation vector for converting the fisheye image into an image that is obtainable by taking an image of the object from a direction parallel to a ground plane of the object, the roll angle and the pitch angle being based on a plane parallel to the ground plane of the object; and image generation means for setting a plurality of viewpoints parallel to the ground plane along a horizontal direction of the fisheye image that is converted using the viewpoint compensation vector, performing a distortion correction by perspective projection approximation on the converted fisheye image based on a coordinate system axes of which include a line of sight from a viewpoint for each of the plurality of viewpoints that are set, and generating a single normalized image using image elements of a vertical direction, the image elements each extracted from corrected fisheye images.

In order to achieve above-described objective, an image processing method according to an aspect of the present invention includes: acquiring a fisheye image in which an object is; acquiring, based on a roll angle around an optical axis of an imaging apparatus and a pitch angle of the optical axis, a viewpoint compensation vector for converting the fisheye image into an image that is obtainable by taking an image of the object from a direction parallel to a ground plane of the object, the roll angle and the pitch angle being based on a plane parallel to the ground plane of the object; and setting a plurality of viewpoints parallel to the ground plane along a horizontal direction of the converted fisheye image using the viewpoint compensation vector, performing a distortion correction by perspective projection approximation on the converted fisheye image based on a coordinate system axes of which include a line of sight from a viewpoint for each of the plurality of viewpoints that are set, and performing image generation of generating a single normalized image using image elements of a vertical direction, the image elements each extracted from corrected fisheye images.

In order to achieve above-described objective, a storage medium according to an aspect of the present invention stores a program that causes a computer to execute: fisheye image acquisition processing of acquiring a fisheye image in which an object is; viewpoint compensation vector acquisition processing of acquiring, based on a roll angle around an optical axis of an imaging apparatus and a pitch angle of the optical axis, a viewpoint compensation vector for converting the fisheye image into an image that is obtainable by taking an image of the object from a direction parallel to a ground plane of the object, the roll angle and the pitch angle being based on a plane parallel to the ground plane of the object; and image generation processing of setting a plurality of viewpoints parallel to the ground plane along a horizontal direction of the converted fisheye image using the viewpoint compensation vector, performing a distortion correction by perspective projection approximation to the converted fisheye image based on a coordinate system axes of which include a line of sight from a viewpoint for each of the plurality of viewpoints that are set, and generating a single normalized image using image elements of a vertical direction, the image elements each extracted from corrected fisheye images. The program stored in the storage medium described above is also be an aspect of the present invention.

Advantageous Effects of Invention

As described above, according to the present invention, it is possible to normalize distortion in a fisheye image without being influenced by a fisheye optical system even when positional relationship between an optical axis of a fisheye camera and a plane to which an object is grounded does not satisfy a certain condition.

BRIEF DESCRIPTION OF DRAWINGS

FIG. 9 illustrates two perspective projection correction images whose horizontalized viewpoints are different and a normalized panoramic image that is obtained from the two perspective projection correction images.

FIG. 10 is a flow chart illustrating operations of the image processing device in the example embodiment of the present invention.

FIG. 11 is a block diagram illustrating an example of a computer that achieves the image processing device of the example embodiment of the present invention.

DESCRIPTION OF EMBODIMENTS

Example Embodiment

Hereinafter, an image processing device, an image processing method, and a program in an example embodiment of the present invention are described with reference to FIG. 1 to FIG. 11.

Device Configuration

Figure 1:
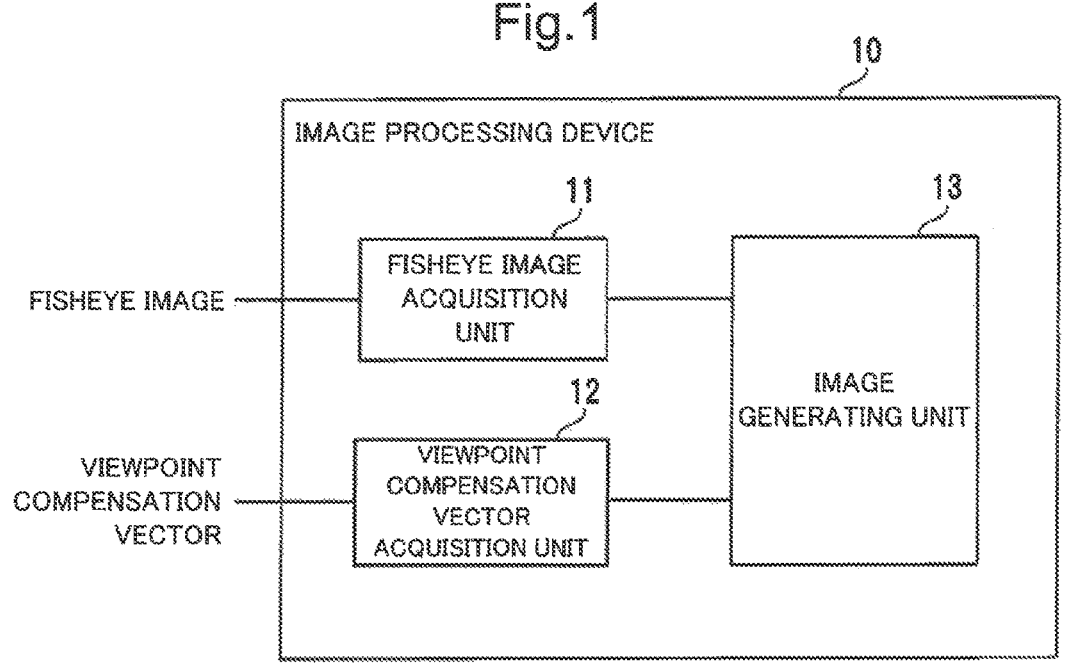
FIG. 1 is a block diagram illustrating a schematic configuration of an image processing device according to an example embodiment of the present invention.

First, by using FIG. 1, the schematic configuration of the image processing device in the present example embodiment is described. FIG. 1 is a block diagram illustrating a schematic configuration of the image processing device in the example embodiment of the present invention.

As illustrated in FIG. 1, an image processing device 10 of the present example embodiment includes a fisheye image acquisition unit 11, a viewpoint compensation vector acquisition unit 12, and an image generating unit 13. Among the units, the fisheye image acquisition unit 11 acquires the fisheye image in which an object is.

The viewpoint compensation vector acquisition unit 12 acquires the viewpoint compensation vector. The viewpoint compensation vector is a vector for converting the fisheye image into an image obtainable by taking an image of an object from a direction parallel to the ground plane on the basis of the roll angle around the optical axis of the imaging apparatus and the pitch angle of the optical axis, which are based on a plane parallel to the ground plane of the object.

First, the image generating unit 13 sets a plurality of viewpoints parallel to the ground plane of the object for the fisheye image that is converted using the viewpoint compensation vector along the horizontal direction thereof. Subsequently, the image generating unit 13 performs, separately for each of the viewpoints that are set, the distortion correction by the perspective projection approximation on the converted fisheye image on the basis of the coordinate system axes of which include a line of sight from a viewpoint. Then, the image generating unit 13 generates a single normalized image by using image elements that are of vertical direction. The image elements each are extracted from the fisheye images on which the distortion correction is already performed.

As above, in the present example embodiment, since the conversion is made using the viewpoint compensation vector, even when the positional relationship between the optical axis of the fisheye camera and the plane to which the object is grounded does not satisfy a certain condition, the distortion in the fisheye image can be normalized.

In the present example embodiment, for each of a plurality of coordinate systems, the distortion correction is performed, and an image for which a viewpoint is changed and which is corrected is obtained. Elements in the vertical direction of the corrected images are combined, and are formed into a final normalized image. Accordingly, in the present example embodiment, even when the design model of the fisheye optical system is not open to the public, removal of the distortion becomes possible, and the removal of the distortion is not influenced by the fisheye optical system.

Figure 2:
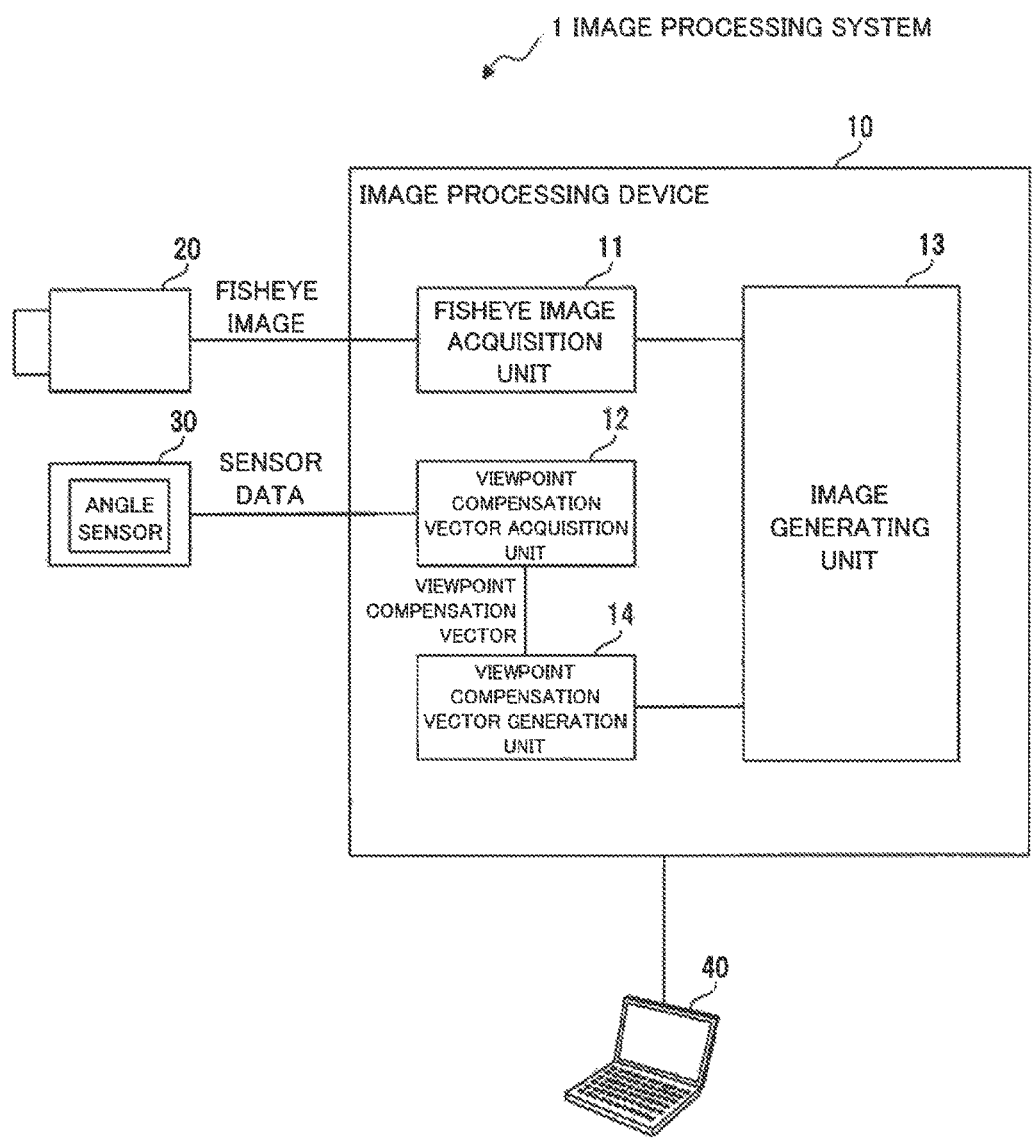
FIG. 2 is a block diagram illustrating a specific configuration of an image processing device 10 according to an example embodiment of the present invention.

Subsequently, a specific configuration of the image processing device 10 according to the present example embodiment is described with reference to FIG. 2 to FIG. 9. FIG. 2 is a block diagram illustrating the specific configuration of the image processing device 10 in the example embodiment of the present invention.

Before making explanation about FIG. 2, terms used in the present example embodiment are explained. In normalization (i.e. removal of distortion) of a fisheye image of the present example embodiment, viewpoints are set to a horizontal plane, and a plane (i.e. a target plane) which is the standards of the horizontal plane is determined. A plane (i.e. ground plane) to which a vertically long object that is a target to which normalization is to be made is grounded is selected as the target plane. If the target to which the normalization is to be made is, for example, a pedestrian, the target plane may be a road surface, a floor surface or the like. The target plane may be defined on a vertical wall surface or a road surface having slope, and does not necessarily need to correspond to the real horizontal plane.

Hereinafter, although descriptions are given for a case where the target plane is a road surface and the target to which the normalization is to be made (subject of fisheye image) is a pedestrian, the applicable scope of the present invention is not limited by those restrictions.

As illustrated in FIG. 2, the image processing device 10 according to the present example embodiment is connected with an image output device 20, a sensor device 30, and a terminal device 40, and achieves an image processing system 1 together with those.

The image output device 20 is a device that outputs the image information to the image processing device 10. In an example of FIG. 2, the imaging apparatus is used as the image output device 20. The imaging apparatus is an apparatus that takes images in real time and continuously outputs the images of a target of photographing. A camcorder and the like that outputs, for example, images in National Television Standards Committee (NTSC) format, in Phase Alternating Line (PAL) format, or in one of various digital types is exemplified as a specific example of the imaging apparatus.

In the present example embodiment, the image output device 20 outputs image data of the fisheye image as image information. Accordingly, a fisheye lens system is exemplified as an optical system used in the imaging apparatus. A fisheye camera that includes a fisheye lens and a imaging device is exemplified as the imaging apparatus.

The image output device 20 may be a device other than the imaging apparatus and may be, for example, an image capturing device. The image capturing device reads out image information stored in a storage medium, converts the format of the read image information into the NTSC format, the PAL format, or other image format that is readable by an electronic controller device, and outputs the converted image information. In this case, the image output device 20 can be implemented by way of a software program operating in a computer that achieves the image processing device 10. The computer that achieves the image processing device 10 is described later. The computer executes image processing based on a predetermined program in response to image information sent from the image output device 20.

The sensor device 30 includes, for example, an angle sensor and outputs information for measuring a relative vector between the optical axis vector of the imaging apparatus and a vector parallel to the ground plane of an object that is supposed to be a photographic subject. A roll angle around an optical axis, a pitch angle of the optical axis, and a yaw angle of the optical axis in the imaging apparatus (refer to FIG. 3 described later) are exemplified as the information that is output.

When a ground plane (i.e. a target plane) of the object is assumed to be a horizontal plane (i.e. the ground), the sensor device 30 sets an initial value to be a value (for example, below-described information of an angle sensor) in a case where the optical axis of the imaging apparatus is parallel to the horizontal direction and a slant of the imaging apparatus is zero (i.e. in a state in which horizontal direction of imaging device is parallel to the horizontal plane), and outputs the difference between the obtained information of the angle sensor and the initial value.

When the ground plane of the object is not the horizontal plane (i.e. the ground), the sensor device 30 takes account of an angle that is measured in advance and is relative to the horizontal plane of the ground plane of the object, and outputs the difference between the obtained information of the angle sensor and the initial value. Separately from the sensor device 30, a sensor device (e.g. an angle sensor) that measures an angle of the ground plane of the object may be installed, and in this case, the sensor device 30 outputs the difference between sensor data of the sensor device 30 itself and sensor data of another sensor device.

In a case where the image output device 20 is the above described image capturing device, information of the angle sensor is generated in advance, and the information of the angle sensor is provided from a storage device that stores the information of the angle sensor synchronously with the image. The information of the angle sensor in this case is exemplified by the roll angle around the optical axis, the pitch angle of the optical axis, and the yaw angle of the optical axis in the imaging apparatus that outputs the image information to be read out.

In the present example embodiment, instead of using the sensor device 30, software calculating a relative vector may be used. In this case, by the software, a difference vector relative to the ground plane of the object is estimated on the basis of, for example, a position and a shape of a reference object in the image. When the relative relationship between the optical axis vector of the imaging apparatus and the ground plane of the object is assumed to be unchanged while images are taken the data that prescribes the above described relative relationship measured in advance may be used instead of this software.

The terminal device 40 provides, on a screen thereof, a user interface. The user interface is used by a user for operations of the image processing device 10 and is used for monitoring of an internal state and outputs of the image processing device 10. The terminal device 40 is also capable of presenting, on the screen thereof, the fisheye image input from the image output device 20, the conversion image that has undergone the image processing by the image processing device 10, various results of image processing using the conversion image and the like.

The terminal device 40 further receives, via an input device thereof, commands of a user to the image processing device 10 such as start of processing, an end of processing, designation of parameters, selection of information presented on the screen, and inputs the received command to the image processing device 10. For example, a switchboard, a keyboard, a mouse, a touch panel and the like are exemplified as the input device.

However, in the present example embodiment, the image processing system 1 may have an aspect of not including the terminal device 40. Further, The image processing system 1 may further include a device that uses, as inputs, information output from the image processing device 10. Such device can be implemented by way of a software program operating in a computer that achieves the image processing device 10. Various types of image processing devices and image recognition devices that receive conversion images generated by the image processing device 10 as inputs are conceivable as examples of such device.

As illustrated in FIG. 2, the image processing device 10 includes a viewpoint compensation vector generation unit 14 in addition to the fisheye image acquisition unit 11, the viewpoint compensation vector acquisition unit 12, and the image generating unit 13, which are described above. Each of the units schematically operates as follows.

In the present example embodiment, the fisheye image acquisition unit 11 acquires image information, i.e., specifically image data of a fisheye image, that is output from the image output device 20 to the image processing device 10. When receiving image data, the image acquisition unit 11 is capable of performing, on the image data, adjustment process concerning an image format including required cut-out processing of an image area, adjustment processing of a resolution and a size, extraction processing of odd fields (or even fields) from an image of the NTSC format, and image quality improvement processing.

In the present example embodiment, the viewpoint compensation vector acquisition unit 12 acquires the viewpoint compensation vector from the viewpoint compensation vector generation unit 14. The viewpoint compensation vector generation unit 14 generates, as the viewpoint compensation vector, a relative vector between an optical axis vector of the imaging apparatus and the vector parallel to the target plane. This relative vector is a vector representing the rotation between two coordinate systems.

Generally, the Quaternion, the Euler angle representation, the Roll-Pitch-Yaw angles representation and the like are exemplified as a representation method of the rotation, and any representation method can be adopted in the present example embodiment. Hereinafter, descriptions are given using Roll-Pitch-Yaw angles representation as an example.

Figure 3:
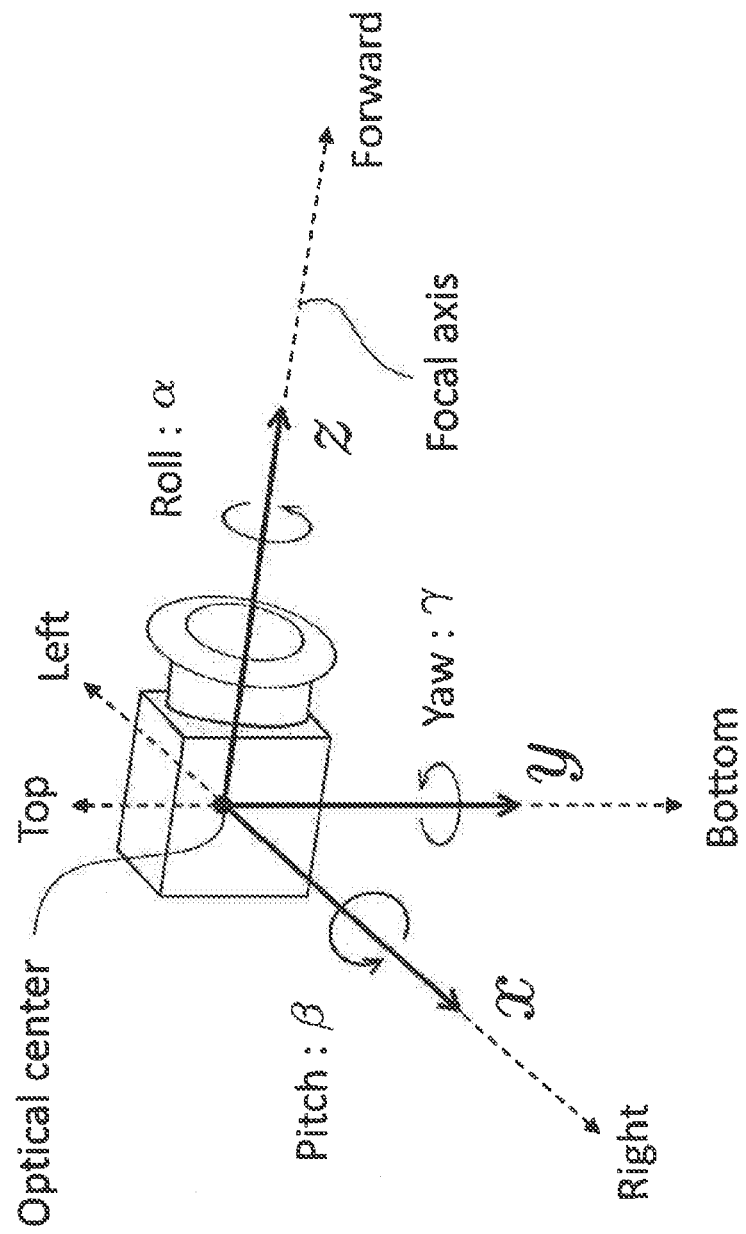
FIG. 3 is a figure illustrating a definition of a coordinate system of an imaging apparatus used in the example embodiment of the present invention.

Coordinates and rotation axes of the imaging apparatus are described by using FIG. 3. FIG. 3 is a figure illustrating a definition, used in the example embodiment of the present invention, of a coordinate system of the imaging apparatus. First, in the present example embodiment, a relative vector includes at least a two-dimensional numerical value including a roll angle and a pitch angle. The roll angle and the pitch angle are rotation angles necessary for causing the horizontal plane (i.e. the x-z plane) including an optical axis of a camera to correspond to the target plane.

In the present example embodiment, any angle included in the range of the horizontal viewing angle of the fisheye image is designated as the yaw angle. The yaw angle is an angle fixes the central viewpoint (in horizontal direction) of a finally generated image. Accordingly, in order to use maximally the horizontal viewing angle of the original fisheye image, it is preferable to use, as the yaw angle, the yaw angle in the optical axis of the real imaging apparatus (e.g. a camera) as it is.

Figure 4:
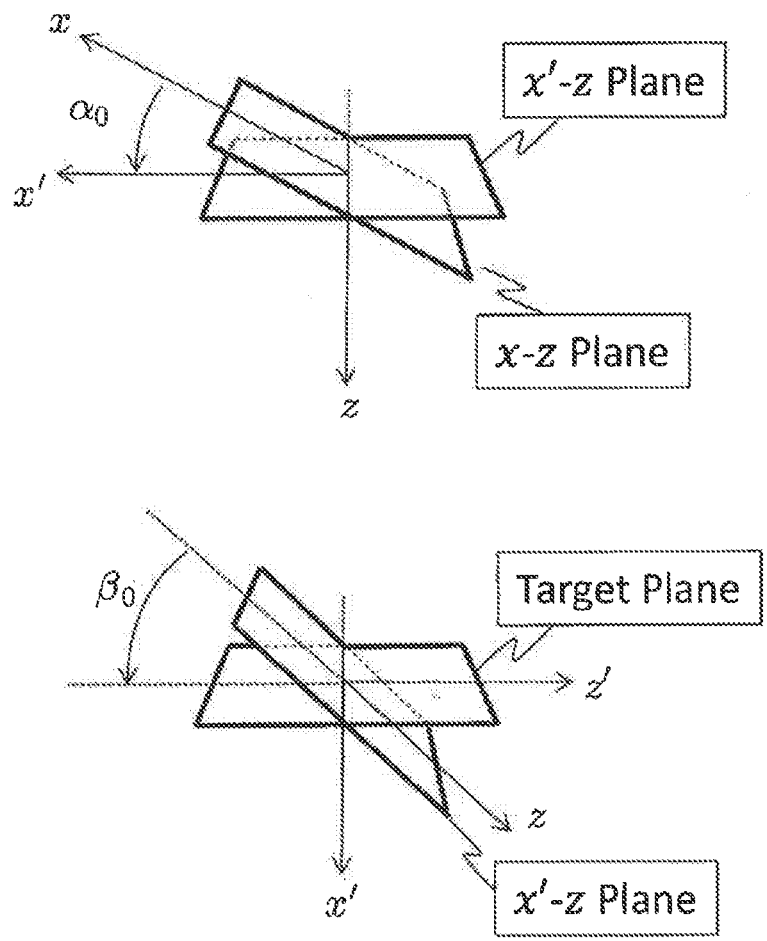
FIG. 4 is a figure for explaining a viewpoint compensation vector that is represented using a Roll-Pitch-Yaw representation.

The representation format of the viewpoint compensation vector is described by using FIG. 4. FIG. 4 is a figure for explaining the viewpoint compensation vector that is represented using the Roll-Pitch-Yaw representation. Referring to FIG. 4, the roll angle and the pitch angle are defined as follows. The roll angle and the pitch angle included in the viewpoint compensation vector are especially referred to as a "relative roll angle" and a "relative pitch angle."

In other words, as illustrated in FIG. 4, in the coordinates of the imaging apparatus, the rotation angle around the z axis from the x-z plane to the x'-z plane that matches with the target plane in the roll angle is defined as the relative roll angle $\alpha_0$. The rotation angle around the x' axis from the x'-z plane to the plane that is parallel to the target plane is defined as the relative pitch angle $\beta_0$.

Assuming that any yaw angle $\gamma_0$ is given, the viewpoint compensation vector V is represented by, for example, Math. 1 described below. When any yaw angle $\gamma_0$ is prescribed by the optical axis of the camera, in the equation 1 below, $\gamma_0=0$ holds in Math. 1 described below.

$$V=(\alpha_0,\beta_0,\gamma_0)^T \quad \text{[Math. 1]}$$

Figure 5:
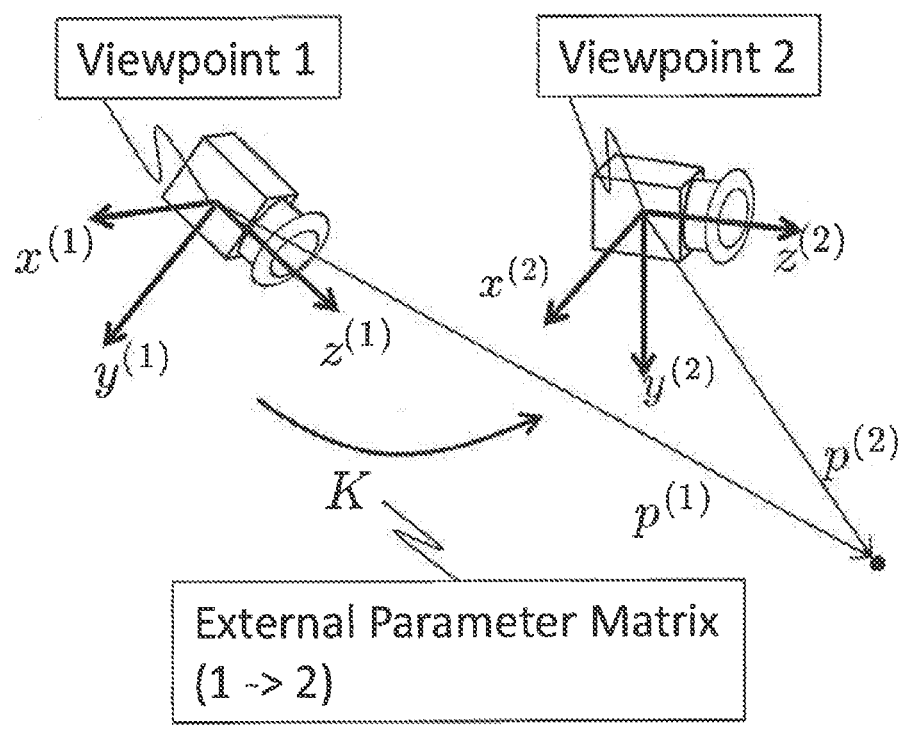
FIG. 5 is a figure for explaining a coordinate transformation, which is performed in the example embodiment of the present invention, between two viewpoints.

By using the viewpoint compensation vector V, it is possible to perform coordinate transformation between two viewpoints. FIG. 5 is a figure for explaining the coordinate transformation between two viewpoints which is performed in the example embodiment of the present invention. Referring to FIG. 5, the coordinate transformation on a certain point in the physical space can be generally described as Math. 2 described below using an external parameter matrix K from the coordinate system 1 to the coordinate system 2.

$$\tilde{p}^{(2)}=K\cdot\tilde{p}^{(1)} \quad \text{[Math. 2]}$$

Here, p tilde$^{(i)}$ is the homogeneous representation of position coordinates in a coordinate system i. The homogeneous representation is represented by Math. 3 described below.

$$\tilde{p}^{(i)}=(x^{(i)},y^{(i)},z^{(i)},1)T \quad \text{[Math. 3]}$$

The K in the Math. 2 described above is described by Math. 4 described below generally by using a rotation matrix R and a translation vector t.

$$K = \begin{pmatrix} & R & & t \\ 0 & 0 & 0 & 1 \end{pmatrix} \quad \text{[Math. 4]}$$

In the Roll-Pitch-Yaw representation, the rotation matrix R is described by Math. 5 described below using a roll angle $\alpha$, a pitch angle $\beta$, and a yaw angle $\gamma$ in the definition.

$$\begin{aligned}
R &:= R_{zxy}(\alpha, \beta, \gamma) \\
&= R_y(\gamma)R_x(\beta)R_z(\alpha) \\
&= \begin{bmatrix} \cos\gamma & 0 & \sin\gamma \\ 0 & 1 & 0 \\ -\sin\gamma & 0 & \cos\gamma \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\alpha & -\sin\alpha & 0 \\ \sin\alpha & \cos\alpha & 0 \\ 0 & 0 & 1 \end{bmatrix} \\
&= \begin{bmatrix} \cos\gamma\cos\alpha + \sin\alpha\sin\beta\sin\gamma & -\cos\gamma\sin\alpha + \sin\gamma\sin\beta\cos\alpha & \sin\gamma\sin\beta \\ \cos\beta\sin\alpha & \cos\beta\cos\alpha & -\sin\beta \\ -\sin\gamma\cos\alpha + \cos\gamma\sin\beta\sin\alpha & \sin\gamma\sin\alpha + \cos\gamma\sin\beta\cos\alpha & \cos\gamma\cos\beta \end{bmatrix}
\end{aligned} \quad \text{[Math. 5]}$$

Here, the viewpoint converted by the viewpoint compensation vector V that is prescribed by Math. 1 described above is referred to as a "central horizontalized viewpoint" and the coordinate system in which the viewpoint is present is referred to as a "central horizontalized viewpoint coordinate system."

Figure 6:
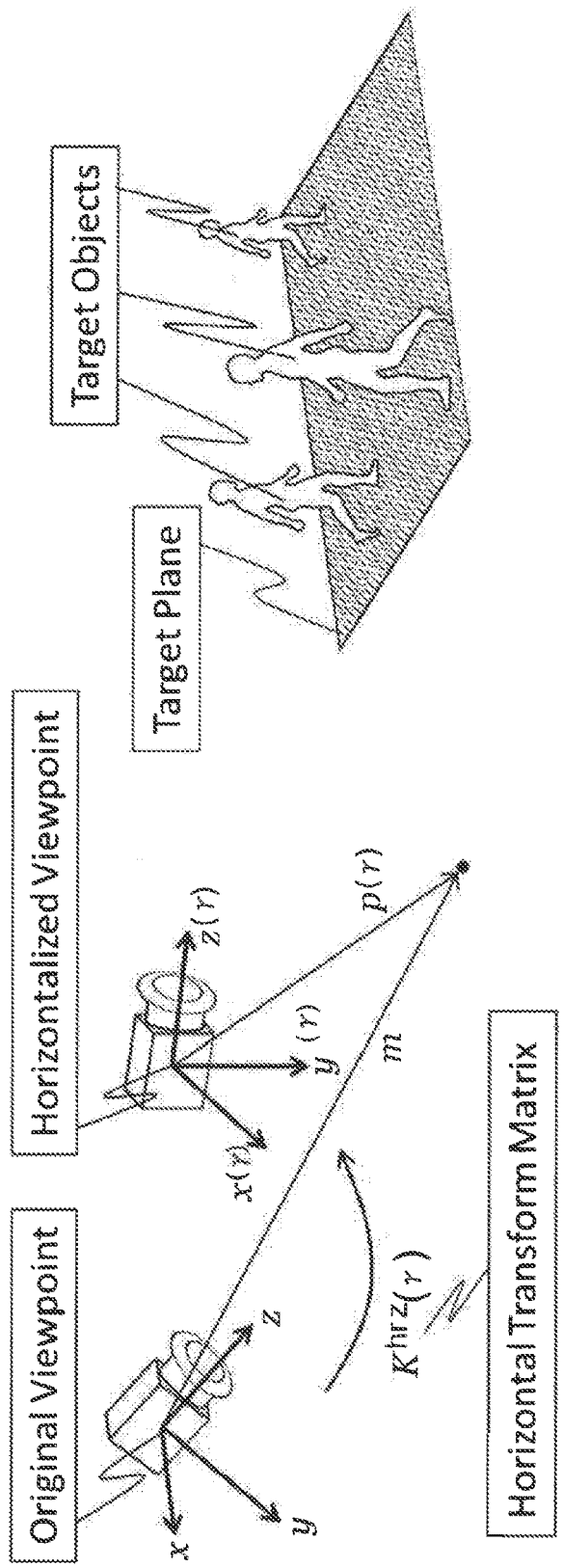
FIG. 6 is a figure for explaining a coordinate system at an original viewpoint and a horizontalized viewpoint coordinate system used in the example embodiment of the present invention.

A set of viewpoints that are parallel to the target plane and each of which is obtained by a rotation by any yaw angle $\gamma$ from the central horizontalized viewpoint is referred to as the "horizontalized viewpoints" and a coordinate system at each of the viewpoints is referred to as the "horizontalized viewpoint coordinate system." FIG. 6 is a figure for explaining the coordinate system at an original viewpoint and a horizontalized viewpoint coordinate system used in the example embodiment of the present invention.

The horizontalized viewpoint coordinate system is obtained through a coordinate transformation by any $\gamma$ and $(\alpha_0, \beta_0)$ of the viewpoint compensation vector. The coordinate transformation to horizontalized viewpoint coordinates can be described by Math. 6 described below by using an external parameter matrix $K^{hrz}(\gamma)$ in which $(\alpha, \beta)=(\alpha_0, \beta_0)$ is assumed in Math. 4 and Math. 5 described above.

$$\tilde{p}^{(\gamma)}=K(\alpha_0,\beta_0,\gamma)\cdot\tilde{m}=K^{hrz}(\gamma)\cdot\tilde{m} \quad \text{[Math. 6]}$$

Here, the coordinates of the coordinate system at the original viewpoint and the coordinates in the horizontalized viewpoint coordinate system are assumed to be Math. 7 and Math. 8 described below, respectively.

$$\tilde{m}=(x,y,z,1)^T \quad \text{[Math. 7]}$$

$$\tilde{p}^{(\gamma)}=(x^{(\gamma)},y^{(\gamma)},z^{(\gamma)},1)^T \quad \text{[Math. 8]}$$

If the central horizontalized viewpoint shares an origin with the original viewpoint, the translation vector t can be set to be $t=(0, 0, 0)^T$ in the $K^{hrz}(\gamma)$.

As described above, if the viewpoint compensation vector V is given, it is possible to define the coordinate transformation $K^{hrz}(\gamma)$ from the coordinate system at the original viewpoint to the horizontalized viewpoint coordinate system. In the present example embodiment, the viewpoint compensation vector generation unit 14 generates the horizontal transform matrix $K^{hrz}(\gamma)$, and gives it to the viewpoint compensation vector acquisition unit.

The image generating unit 13, in the present example embodiment sets a viewpoint on the basis of the number of all the pixels in the horizontal direction of the normalized image to be generated. The image generating unit 13 performs distortion corrections separately for each of the viewpoint, then cuts out images in the vertical direction from the corrected fisheye images, and thereby extracts slice images each of which a visual line from a viewpoint enters. Then, the image generating unit 13 arranges the extracted slice images in predetermined order in the horizontal direction, and thereby generates a single normalized image.

Specifically, first, the image generating unit 13 determines, by using the viewpoint compensation vector V, a set of horizontalized viewpoints for the fisheye image which is acquired by the fisheye image acquisition unit 11. Next, the image generating unit 13 divides the view area by any in the horizontal direction, and performs the distortion correction by the perspective projection approximation in the horizontalized viewpoint coordinate system of the set of the horizontalized viewpoints (i.e. the horizontalized viewpoint sequence). The image generating unit 13 aligns, in the horizontal direction, image elements which are of vertical direction and each of which passes through a center from a viewpoint in order of the horizontalized viewpoint sequence, combines them, and thereby generates a single composite image. Hereinafter, details of the processes by the image generating unit 13 are described.

Distortion correction by perspective projection approximation: The distortion correction by the perspective projection approximation is specifically described. The distortion correction by the perspective projection approximation (i.e. perspective projection correction) can be generally achieved by the following methods if a camera model and calibrated internal parameters in the camera model are already known. Although the distortion correction by the perspective projection approximation can be achieved by an existing technology, a simple explanation is given below as a reference.

The relational expression between a point $p=(x, y, z)^T$ in the real space in a general camera coordinate system and a point on the fisheye image can be modeled by following Math. 9 to Math. 11. Here, $\rho'$ in Math. 9 is represented by Math. 12.

$$\tilde{p}^{(\gamma)} = (x^{(\gamma)}, y^{(\gamma)}, z^{(\gamma)}, 1)^T \quad \text{[Math. 9]}$$

$$f(\rho') = a_0 + a_1 \cdot \rho' + a_2 \cdot {\rho'}^2 + \Lambda + a_N \cdot {\rho'}^N \quad \text{[Math. 10]}$$

$$\begin{bmatrix} u'' \\ v'' \end{bmatrix} = \begin{bmatrix} c & d \\ e & 1 \end{bmatrix} \begin{bmatrix} u' \\ v' \end{bmatrix} + \begin{bmatrix} u_o'' \\ v_o'' \end{bmatrix} \quad \text{[Math. 11]}$$

$$\rho' = \sqrt{u'^2 + v'^2} \quad \text{[Math. 12]}$$

The (u', v') in above described Math. 9 and Math. 11 represents the coordinates of the ideal fisheye image (whose center is set to be the origin) without the affine distortion. The (u", v") in Math. 12 represents the coordinates of the actual fisheye image (whose upper left corner is set to be the origin) and the ($u_0$", $v_0$") represents the center coordinates of the actual fisheye image. The square matrix of 2×2 in Math. 11 is the affine transformation matrix.

The parameters which are obtained by approximating coefficients of Math. 10 described above up to the fourth order are internal camera parameters which are determined from distortion characteristics of a fisheye lens and deviation in positional relationship between the optical axis of the fisheye lens and an imaging device. The concerning parameters are represented in Math. 13 described below.

$$[a_0, a_1, a_2, a_3, a_4, c, d, e, u_o^H, v_o^H] \quad \text{[Math. 13]}$$

The parameters represented in Math. 13 described above can be obtained in advance by a calibration method disclosed in Reference Document 1 described below.

REFERENCE DOCUMENT

Davide Scaramuzza, Agostino Martinelli and Roland Siegwart, "A Toolbox for Easily Calibrating Omnidirectional Cameras", IROS, 2006.

If the image plane ($z=z_d$) set to be vertical to the z axis of the coordinate system, it is possible to calculate, by using the relational expressions of Math. 9 to Math. 11 described above, the corresponding coordinates (u", v") of the fisheye image to the coordinates ($u_d$, $v_d$), defined on the image plane ($z=z_d$), of the image. Accordingly, it is possible to generate an image (referred to as "perspective projection correction image") on which the distortion correction by the perspective projection approximation is performed, by referring the pixel value of the coordinates (u", v"), in the fisheye image, that correspond to the coordinates ($u_d$, $v_d$) in the image, and by replacing the pixel value of the coordinates ($u_d$, $v_d$) in the image with the pixel value of the coordinates (u", v") in the fisheye image.

A pixel value of the fisheye image coordinates is a brightness value of one channel in a case of a monochrome image and is brightness values of three channels of RGB in a case of a color image. The value of $z=z_d$ represents a distance to the projection plane from the focal point, and the value is a parameter that determines a scale of the perspective projection correction image.

Effect of distortion correction by perspective projection approximation:

It is possible to define the perspective projection image plane at any horizontalized viewpoint because the horizontal transform matrix is given by the viewpoint compensation vector. According to the result, the image generating unit 13 generates a perspective projection correction image at a viewpoint by using the methods described above for each of the horizontalized viewpoints.

It is known that in the perspective projection correction image, while the linearity is restored, the scale distortion of a subject is larger due to the projection distortion in a peripheral part as it is more peripheral. Therefore, the image generating unit 130 extracts only central column images of the perspective projection correction images generated for the viewpoints, and combines the central column images in the horizontal direction. What is generated accordingly is a connected single image in which the scale distortion of the horizontal direction is suppressed and the linearity of the vertical direction is kept. Accordingly, what is generated is a single normalized image in which all vertically long three-dimensional objects that are shown on the original fisheye image and are present on the target plane have a consistent scale and there is small shape distortion.

Specific Process by Image Generating Unit

Specific examples of processes by the image generating unit 13 are described below. In the perspective projection correction image ($I_P$) generated in each horizontalized viewpoint coordinate system from the original fisheye image ($I_F$), a column image that passes the center is referred to as a "normalized slice image ($I_S$)." The final output image is referred to as a "normalized panoramic image ($I_H$)." In the present example embodiment, a series of functions until generating the normalized panoramic image are functions of the image generating unit 13.

First, in the image generating unit 13, a size (width, height)=($W_O$, $H_O$) of the finally output image is defined. Next, the image generating unit 13 defines the horizontalized viewpoint sequence used for the synthesis of the normalized panoramic image. A roll angle and a pitch angle of a viewpoint are determined by a viewpoint compensation vector Vector V, and thus, it is enough here if a set $\Phi$ of the yaw angles $\phi_i$ is defined. Hereinafter, a horizontalized viewpoint in which the yaw angle is $\phi_i$ may be referred to as the horizontalized viewpoint $\phi_i$. The $\Phi$ is assumed to be a series whose number is the same as the number of horizontal pixels of the image and is represented by Math. 14 described below.

$$\Phi = \{\phi_i | \phi_i > \phi_{i+1}, i=0,\ldots,W_o-1\} \quad \text{[Math. 14]}$$

The $\Phi$ can be set to be any within the horizontal view area of the original fisheye image. The upper limit and the lower limit of $\Phi$ determine the horizontal view area (FOV_H) rendered in the normalized panoramic image. For example, when a horizontal view area of FOV_H=185° is ensured, the range of the horizontalized viewpoint sequence is the range represented in Math. 15 described below.

$$[\phi_{min}, \phi_{max}] = [-92.5°, 92.5°] \quad \text{[Math. 15]}$$

Generally, a fisheye image is modeled as mapping to one direction of a point group projected on a spherical surface model in the real space. At this time, the sphere center is assumed to be identical to the optical center. The origin of each horizontalized viewpoint coordinate system is set to be identical to the optical center, and thus, the $\Phi$ can be defined with the homogeneous resolution as represented in Math. 16 described below. Here, in Math. 16 below, $i=0, \ldots, W_0-1$ is defined.

$$\Phi = \left\{ \Phi_i = \phi_{max} - \frac{\phi_{max} - \phi_{min}}{W_o - 1} \cdot i \right\} \quad \text{[Math. 16]}$$

The point in each horizontalized viewpoint coordinate system (Math. 17) is derived by Math. 18 described below by using the horizontal transform matrix $K^{hrz}(\gamma)$ because the point m tilde in the original camera coordinate system is represented as "$(x, y, z, 1)^T$".

$$O^{(\phi i)} \quad \text{[Math. 17]}$$

$$\tilde{p}^{(\phi i)} = K^{hrz}(\phi_i) \cdot \tilde{m} \quad \text{[Math. 18]}$$

As described above, when an image plane (Math. 20) vertical to the z axis (Math. 19) of the horizontalized viewpoint coordinate system (Math. 17) is set, correspondence to the pixel (u", v") in the original fisheye image is derived in the image coordinates (Math. 21) defined on the image plane (Math. 20). The image in which a point of a pixel on a fisheye image is projected on the image coordinates (Math. 21) is the perspective projection correction image. The constant in Math. 20 represent the distance to the projection plane from the focal point, and the constant is a parameter that determines the scale of the perspective projection correction image.

$$z^{(\phi i)} \quad \text{[Math. 19]}$$

$$z^{(\phi i)} = z_d^{(\phi i)} = \text{const.} \quad \text{[Math. 20]}$$

$$(u_d^{(\phi i)}, v_d^{(\phi i)}) \quad \text{[Math. 21]}$$

The column image in the vertical direction that passes the center of the perspective projection correction image ($I_P$) is the normalized slice image ($I_S$). The normalized slice image ($I_S$) is a special variation of the perspective projection correction image ($I_P$) generated under a condition where the horizontal size of the projected image is set to be one pixel when the perspective projection correction image ($I_P$) is projected to the perspective projection image plane. Note that it is not necessary to perform cutout after generating another perspective projection correction image ($I_P$) having the larger horizontal size in order to generate the normalized slice image ($I_S$).

The scale parameter (Math. 23) used when the normalized slice image (Math. 22) is generated in each horizontalized viewpoint coordinate system (Math. 17) is generally set to be the same value in each horizontalized viewpoint coordinate system and needs to be set based on consideration to the aspect ratio of height to width in the final normalized panoramic image. The scale parameters can be defined not only directly by a value, but also indirectly by another parameter as described later.

$$I_S^{(\phi i)} \quad \text{[Math. 22]}$$

$$Z_d = \{z_d^{(\phi i)}\} \quad \text{[Math. 23]}$$

In the present example embodiment, the synthesized image obtained by aligning the normalized slice images (Math. 22) each in horizontalized viewpoint coordinate systems (Math. 17) from the left in order of the series $\Phi$ of the yaw angles $\phi i$ of the horizontalized viewpoints is set to be the normalized panoramic image ($I_H$). Each element of the normalized panoramic image ($I_H$) is defined by Math. 24 described below. Here, in Math. 24, image coordinates are represented in parentheses. Further, $i=0, 1, \ldots W_0-1$, and $j=0, 1, \ldots H_0-1$ are defined.

$$\{I_H(i,j)\} = \{I_S^{(\phi i)}(0,j)\} \quad \text{[Math. 24]}$$

Figure 7:
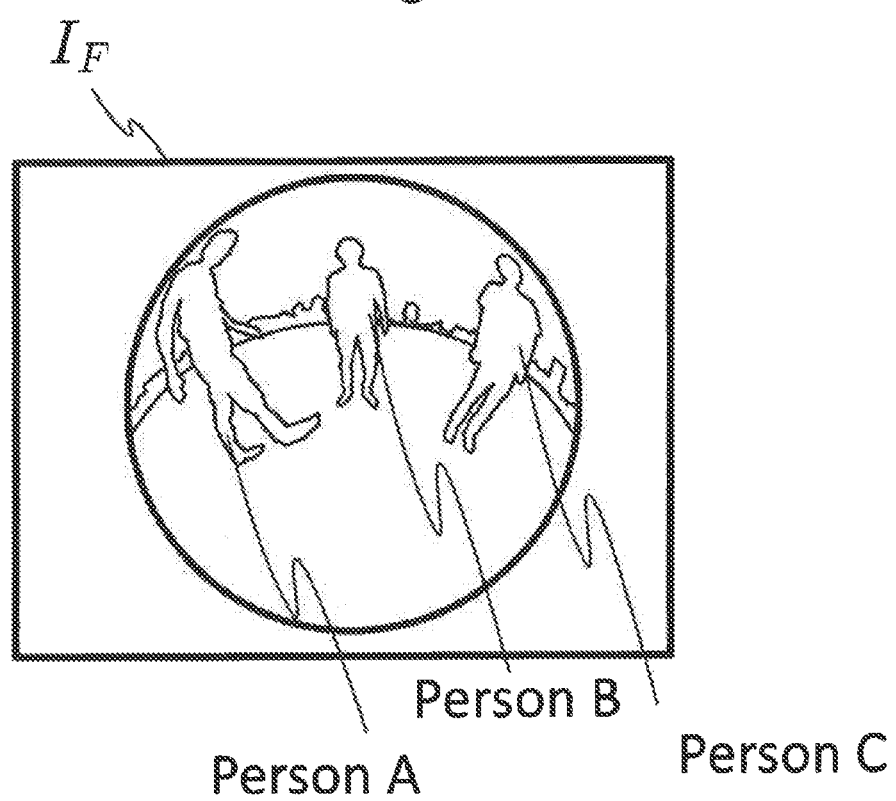
FIG. 7 is a figure schematically illustrating one example of a fisheye image ($I_F$) that is a target in the example embodiment of the present invention.
Figure 8:
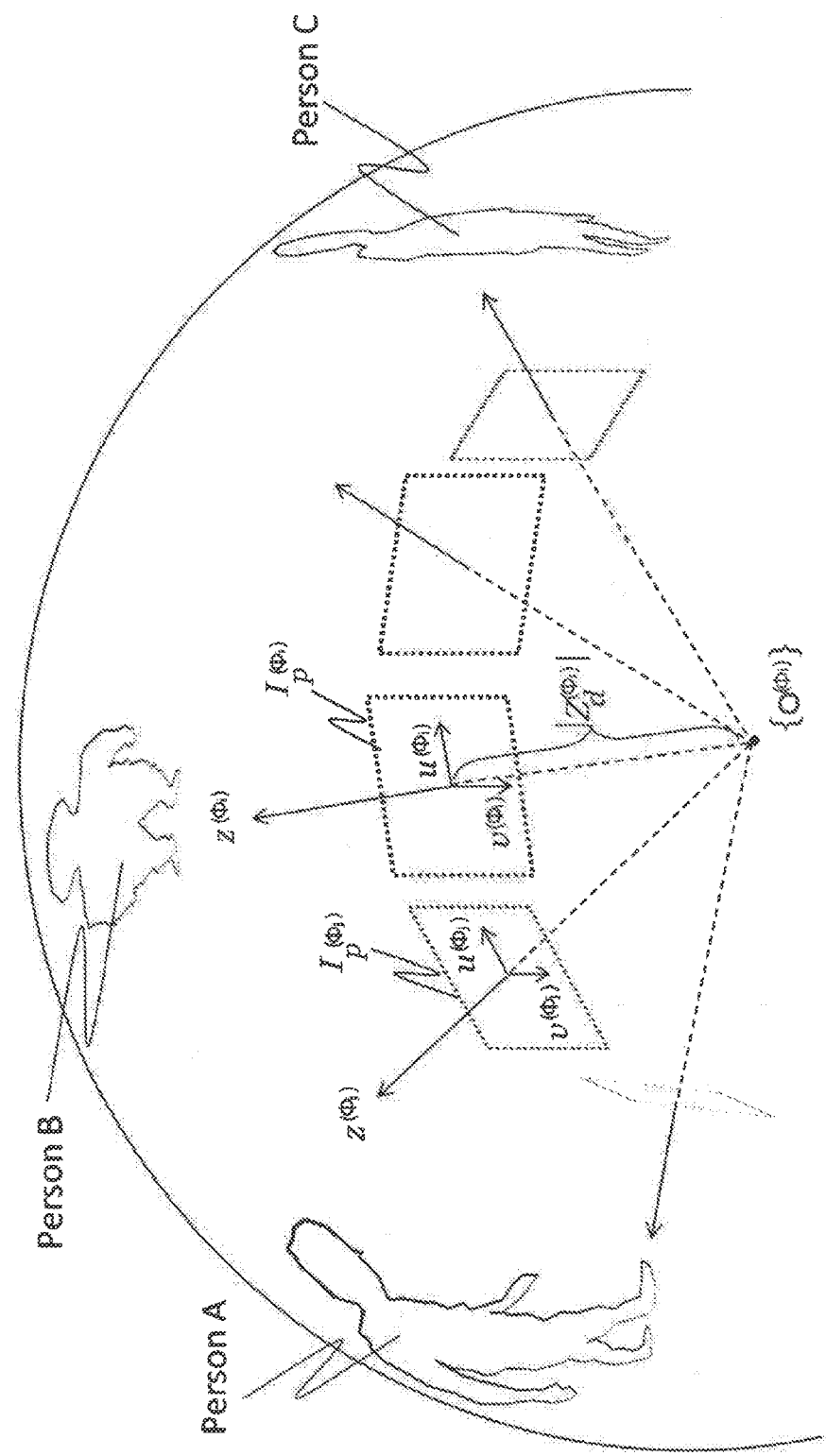
FIG. 8 is a figure illustrating one example of the horizontalized viewpoint coordinate system that is defined in the example embodiment of the present invention.

An example of the fisheye image and the concerning image generation processing are described by using FIG. 7 to FIG. 9. FIG. 7 is a figure schematically illustrating an example of the target fisheye image ($I_F$) in the example embodiment of the present invention. In the example of FIG. 7, persons (Person A, Person B, and Person C) photographed from a downward viewpoint are taken in the fisheye image in which the ground is considered as the target plane.

Processing by the image processing device 10 are executed on the fisheye image illustrated in FIG. 7. This defines a perspective projection image plane in each horizontalized viewpoint coordinate system (Math. 17) as illustrated in FIG. 8. FIG. 8 is a figure illustrating an example of horizontalized viewpoint coordinate systems defined in the example embodiment of the present invention. The coordinates on the perspective projection image plane are represented by Math. 21 described above. The perspective projection correction image ($I_P$: Math. 25) of any image size including the normalized slice image ($I_S$) is generated on the perspective projection image plane.

$$I_P^{(\phi i)} \quad \text{[Math. 25]}$$

FIG. 9 illustrates two perspective projection correction images whose horizontalized viewpoints are different and a normalized panoramic image that is obtained from the perspective projection correction images.

Specifically, the left figure of FIG. 9 illustrates the perspective projection correction image (Math. 27) and the normalized slice image (Math. 28) that are generated with the horizontalized viewpoint (Math. 26). Further, the middle figure of FIG. 9 illustrates the perspective projection correction image (Math. 30) and the normalized slice image (Math. 31) that are generated with the horizontalized viewpoint (Math. 29).

$$O^{(\phi i)} \quad \text{[Math. 26]}$$

$$I_P^{(\phi i)} \quad \text{[Math. 27]}$$

$$I_S^{(\phi i)} \quad \text{[Math. 28]}$$

$$O^{(\phi j)} \quad \text{[Math. 29]}$$

$$I_P^{(\phi j)} \quad \text{[Math. 30]}$$

$$I_S^{(\phi j)} \quad \text{[Math. 31]}$$

The right figure of FIG. 9 illustrates an example of the normalized panoramic image ($I_H$) generated by using all normalized slice images in the defined parallel viewpoint sequence (Math. 32). As illustrated in FIG. 9, the normalized panoramic image ($I_H$) is synthesized by using all normalized slice images including the normalized slice image (Math. 28 described above) and the normalized slice image (Math. 31 described above) as elements.

$$\Phi = \{\phi_i\} \quad \text{[Math. 32]}$$

Indirect determination processing of scale parameters: In distortion correction by the perspective projection approximation for each viewpoint, the image generating unit 13 determines the distance of the projection plane to the origin in the horizontalized viewpoint coordinate system on the basis of the size, the range of the viewing angle in the horizontal direction, and the aspect ratio of the normalized panoramic image to be generated.

In other words, an image scale at the time when the perspective projection correction image and the normalized slice image are generated is determined according to the distance $|z_d|$ of the projection plane for coordinates as described above. However, in practice, there is a case where it is more convenient to indirectly determine the scale to satisfy a constraint condition for a view area, an image size and the like of the normalized panoramic image rather than directly determining the scale.

Here, a method for obtaining a scale by designating the size of the image, the range of the viewing angle in the horizontal direction, and the aspect ratio of the image is described. Let $(W_0, H_0)$ be the size (width, height) of the normalized panoramic imag, let $A_X$ be the size of the viewing angle in the horizontal direction projected to the normalized panoramic image, and let $A_y$ be the size of the viewing angle in the vertical direction. Let Math. 33 described below be the vertical and horizontal (angle/pixel) ratio in the normalized panoramic image. However, in Math. 33 described above, the upper limit of $A_y$ is assumed to be 180 degrees (Math. 34).

$$\mu = \frac{A_Y / H_o}{A_X / W_o} \quad \text{[Math. 33]}$$

$$A_{Y_{max}} < 180° \quad \text{[Math. 34]}$$

The scale $|zd|$ is determined by following steps (a) and (b).

Step (a):
Determining $(|z_d|, A_y)$ by letting $(W_0, H_0, A_X, \mu)$ be the constraint condition and by using Math. 35 and Math. 36 below.

$$A_Y = A_X \times \frac{H_o}{W_o} \times \mu \quad \text{[Math. 35]}$$

$$|z_d| = \frac{H_o/2}{\tan(A_Y/2)} \quad \text{[Math. 36]}$$

Step (b):
Replacing $(A_X, A_y, |z_d|)$ with Math. 41 described below by the recalculation using Math. 38 to Math. 40 described below when Math. 37 described below holds true.

$$A_Y \geq A_{Y_{max}} \quad \text{[Math. 37]}$$

$$A_Y^* = A_{Y_{max}} \quad \text{[Math. 38]}$$

$$A_X = A_Y^* \times \frac{W_o}{H_o} \times \frac{1}{\mu} \quad \text{[Math. 39]}$$

$$|z_d|^* = \frac{H_o/2}{\tan(A_Y^*/2)} \quad \text{[Math. 40]}$$

$$(A_X^*, A_Y^*, |z_d|^*) \quad \text{[Math. 41]}$$

Speeding up by LUT processing:
In the present example embodiment, the viewpoint compensation vector acquisition unit 12 can acquire the table describing, as viewpoint compensation vectors, association between coordinates on an image to be obtained by taking an image of an object from a direction parallel to the ground plane and coordinates on a fisheye image.

Specifically, in the present example embodiment, when the predetermined fixed viewpoint compensation vector is used, the viewpoint compensation vector generation unit 14 generates in advance a reference table describing association from coordinates $(u_H, v_H)$ on a normalized panoramic image to corresponding coordinates (u", v") on an original fisheye image. In this case, generation processing of an actual normalized panoramic image for an input image series is replaced with table reference (LUT: Look-Up-Table) processing generating a normalized panoramic image while referring to the reference table.

For example, it is possible to generate a normalized panoramic image at high speed by generating the reference table at offline and executing processing of generating normalized panoramic images sequentially for an online image input series through the LUT processing. In this aspect, it is possible to build the image processing system suitable for the use application which requires implementation on a processor of a low processing clock.

A method schematically described below can be considered as a specific generation method of the reference table. First, matrices, each of which has a width and a height of the size $(W_{in}, H_{in})$ of the original fisheye image, (each referred to as an index map) of two channels is prepared. To each row of X index map $(X_{ind})$ that is a matrix of the first channel, the coordinate value of corresponding (u") is given, and to each line of Y index map $(Y_{ind})$ that is a matrix of the second channel, the coordinate value of corresponding (v") is given.

In other words, the index maps are defined by Math. 42 and Math. 43 below. In addition, Math. 44 is given as a condition.

$$\{X_{ind}(i,j)=u"(i) | i=0,\ldots,W_{in}-1, j=0,\ldots,H_{in}-1\} \quad \text{[Math. 42]}$$

$$\{Y_{ind}(i,j)=v"(j) | i=0,\ldots,W_{in}-1, j=0,\ldots,H_{in}-1\} \quad \text{[Math. 43]}$$

$$\{u"(i)=i | i=0,\ldots,W_{in}-1\}, \{v"(j) | j=0,\ldots,H_{in}-1\} \quad \text{[Math. 44]}$$

After the image generating unit 13 executes generation of normalized panoramic images by using $(X_{ind})$ and $(Y_{ind})$ respectively as input, the viewpoint compensation vector generation unit 14 generates LUT maps $(X_{LUT})$ and $(Y_{LUT})$ from the normalized panoramic images. At coordinates $(u_H, v_H)$ of $(X_{LUT})$ and $(Y_{LUT})$ in the LUT map, values of corresponding coordinates (u") and (v") of the original fisheye image is stored. Accordingly, one-to-one correspondence between coordinates of $(u_H, v_H)$ and coordinates (u", v") on the fisheye image can be obtained.

The LUT map generated in this manner can be, for example, stored as a reference table file in a text file format or the like in which the one-to-one correspondence (Math. 45) is listed line by line.

$$[u_H, v_H, u", v"] \quad \text{[Math. 45]}$$

In the LUT processing, the image generating unit 13 first reads the reference table file generated in advance. Then, the image generating unit 13 sequentially refers to a pixel value, on the fisheye image, related with coordinates on the normalized panoramic image according to the information, described in the reference table, that associates the coordinates $(u_H, v_H)$ of a normalized panoramic image and the coordinates (u", v") of the original fisheye image which is acquired, and generates the normalized panoramic image.

Operations of Device

Next, operations of the image processing device 10 according to the present example embodiment are described with reference to FIG. 10. FIG. 10 is a flow chart illustrating operations of the image processing device according to the example embodiment of the present invention. In the following descriptions, FIG. 1 to FIG. 9 are referred to appropriately. In the present example embodiment, the image processing method is carried out by operating the image processing device 10. Thus, descriptions of the image processing method according to the present example embodiment are replaced by following descriptions of operations of the image processing device 10.

As illustrated in FIG. 10, first, the fisheye image acquisition unit 11 acquires a fisheye image from the image output device 20 (step S1). Next, the viewpoint compensation vector acquisition unit 12 acquires a viewpoint compensation vector (step S2).

Then, the image generating unit 13 generates a normalized panoramic image by using the fisheye image acquired at step S1 and the viewpoint compensation vector acquired at step S2 (step S3).

Specifically, the image generating unit 13 first sets a set of horizontalized viewpoints for the fisheye image by using the viewpoint compensation vector. Then, the image generating unit 13 divides a view area by any in the horizontal direction, and in each of the horizontalized viewpoint coordinate system of each horizontalized viewpoint, performs distortion correction by the perspective projection approximation. The image generating unit 13 aligns, in the horizontal direction, the image elements which are of vertical direction and each of which passes a center of a viewpoint in order of the horizontalized viewpoint sequence and combines the aligned image elements, and thereby generates a single normalized panoramic image.

As described above, by performing step S1 to step S3, a single normalized panoramic image is generated. Further, in the present example embodiment, step S1 to step S3 are repeatedly performed at set intervals, and thus, the normalized panoramic image is consecutively output.

Effect in Example Embodiment

As described above, in the present example embodiment, the positional relationship between the fisheye camera and the ground plane is compensated, additionally the shape distortion of the image of the pedestrian in the fisheye image is corrected, and the image of the pedestrian is normalized such that the image of the pedestrian seems to be similar to an ordinary camera image. The image obtained through normalization is obtained by combining the normalized slice images of the perspective projection correction image obtained for each of the horizontalized viewpoints in the whole range of the horizontal field of view. Thus, according to the present example embodiment, accuracy of distortion correction is not influenced by the optical system of the imaging apparatus. Even when the positional relationship between the optical axis of the fisheye camera and the ground plane of the object does not satisfy a certain condition, distortion in the fisheye image is removed with high accuracy.

As a result, according to the present example embodiment, in the monitoring system and the on-board rear-view monitor system using the fisheye camera, it is possible to present to a user an image in which the pedestrian can be visually recognized easily. Further, use of the processing in the present example embodiment as preprocessing enables application of a pedestrian detection involving application of a pattern recognition technology that is designed and learned on the assumption that an image by an existing ordinary camera is obtained.

Further, in the present example embodiment, as described above, it is also possible to adopt the LUT form in which the conversion table is referred in the image conversion processing using the viewpoint compensation vector. This case enables high-speed processing, and is suitable for application such as an in-vehicle processor that requires reduced power consumption and real-time operation.

Program

A program in the present example embodiment may be a program that causes a computer to perform steps S1 to S3 illustrated in FIG. 10. By installing the program to a computer and causing the program to be executed, it is possible to achieve the image processing device 10 and the image processing method according to the present example embodiment. In this case, a Central Processing Unit (CPU) of the computer functions as the fisheye image acquisition unit 11, the viewpoint compensation vector acquisition unit 12, the image generating unit 13, and the viewpoint compensation vector generation unit 14, and performs the processing. The computer may be not only a general-purpose computer such as personal computer but also a computer mounted on a motor vehicle, home electric appliances, work equipment and the like.

The program in the present example embodiment may be executed by a computer system implemented using a plurality of computers. In this case, for example, each computer may function as any of the fisheye image acquisition unit 11, the viewpoint compensation vector acquisition unit 12, the image generating unit 13, and the viewpoint compensation vector generation unit 14.

Physical Configuration

The computer that achieves the image processing device 10 by executing the program in the present example embodiment is described with reference to FIG. 11. FIG. 11 is a block diagram illustrating an example of a computer that achieves the image processing device according to the example embodiment of the present invention.

As illustrated in FIG. 11, a computer 110 includes a CPU 111, a main memory 112, a storage device 113, an input interface 114, a display controller 115, a data reader/writer 116, and a communication interface 117. These units are connected via a bus 121 such that they can perform data communication with one another.

The CPU 111 loads the program (code) of the present example embodiment stored in the storage device 113 into the main memory 112, and executes the program in predetermined order, thereby performing various operations. The main memory 112 is typically a volatile storage device such as a Dynamic Random Access Memory (DRAM). The program of the present example embodiment is provided in a state where the program is stored in the computer readable storage medium 120. The program of the present example embodiment may be distributed on the internet connected via the communication interface 117.

A specific example of the storage device 113 may be, not only a hard disk drive, but also a semiconductor storage device such as a flash memory. The input interface 114 mediates the data transmission between the CPU 111 and an input device 118 such as keyboard and mouse. The display controller 115 is connected with the display device 119 and controls display on the display device 119.

The data reader/writer 116 mediates the data transmission between the CPU 111 and the storage medium 120, reads the program from the storage medium 120, and writes a processing result of the computer 110 into the storage medium 120. The communication interface 117 mediates the data transmission between the CPU 111 and another computer.

A specific example of the storage medium 120 may be a general-purpose semiconductor memory device such as Compact Flash (CF (a registered trademark)) and Secure Digital (SD (a registered trademark)), a magnetic storage medium such as flexible disk, or an optical storage medium such as Compact Disc Read Only Memory (CD-ROM).

The image processing device 10 according to the present example embodiment can be achieved by using hardware corresponding to each unit instead of the computer on which the program is installed. Further, a part of the image processing device 10 may be achieved by using the program and remaining part may be achieved by using the hardware.

Main signs used in this description are listed below.

Index numbers for certain elements of sum: i, j, . . .

Rotation angle (roll, pitch, yaw) in camera coordinate system: $\alpha$, $\beta$, $\gamma$ Rotation matrix: R Translation vector: t Camera external parameter matrix in general coordinate transformation: K Horizontal transform matrix for any yaw angle $\gamma$: $K^{hrz}(\gamma)$ Point of original camera coordinate system: m tilde=$(x, y, z, 1)^T$ Original fisheye image: $I_F$ Coordinates of original fisheye image: (u", v")

Normalized panoramic image: $I_H$

Output size (width, height) of normalized panoramic image: ($W_0$, $H_0$)

Series of yaw angle in horizontalized viewpoints: $\Phi=\{\phi_i\}$

Horizontalized viewpoint coordinate system for certain horizontalized viewpoint $\phi i$: (Math. 46)

Perspective projection image plane coordinates for certain horizontalized viewpoint $\phi i$: (Math. 47)

Perspective projection correction image for certain horizontalized viewpoint $\phi i$: (Math. 48)

Normalized slice image for certain horizontalized viewpoint: (Math. 49)

Scale parameters: (Math. 50)

$$O^{(\phi_i)} \qquad [\text{Math. 46}]$$

$$(u_d^{(\phi_i)}, v_d^{(\phi_i)}) \qquad [\text{Math. 47}]$$

$$I_P^{(\phi_i)} \qquad [\text{Math. 48}]$$

$$I_S^{(\phi_i)} \qquad [\text{Math. 49}]$$

$$Z_d=\{z_d^{(\phi_i)}\} \qquad [\text{Math. 50}]$$

Although a part or the whole of the example embodiments described above can be represented by Supplementary Note 1 to Supplementary Note 15 described below, a part or the whole of the example embodiments described above is not limited to the following descriptions.

(Supplementary Note 1)

An image processing device including:

fisheye image acquisition means for acquiring a fisheye image in which an object is;

viewpoint compensation vector acquisition means for acquiring, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and image generation means for setting a plurality of viewpoints for a converted fisheye image along a horizontal direction of the converted fisheye image, the plurality of viewpoints being parallel to the ground plane, the converted fisheye image being the fisheye image converted using the viewpoint compensation vector, performing a distortion correction by perspective projection approximation on the converted fisheye image based on a coordinate system axes of which include a line of sight from a viewpoint for each of the plurality of viewpoints that are set, and generating a single normalized image using image elements of vertical direction, the image elements each extracted from corrected fisheye images.

(Supplementary Note 2)

The image processing device according to Supplementary Note 1, wherein the image generation means sets the viewpoint based on an all pixel number in a horizontal direction of the normalized image to be generated, performs, for each of the plurality of viewpoints, cutting out from the corrected fisheye image in a vertical direction after performing the distortion correction, extracts slice images to each of which a line of sight from a viewpoint enters, arranges the extracted slice images in predetermined order in a horizontal direction, and generates the single normalized image.

(Supplementary Note 3)

The image processing device according to Supplementary Note 1 or 2, wherein the image generation means determines, in the distortion correction by perspective projection approximation for each of the plurality of viewpoints, a distance of a projection plane to an origin in the coordinate system based on a size of the normalized image to be generated, a range of a viewing angle in a horizontal direction of the normalized image, and an aspect ratio of the normalized image.

(Supplementary Note 4)

The image processing device according to any one of Supplementary Notes 1 to 3, wherein the viewpoint compensation vector acquisition means acquires, as the viewpoint compensation vector, a table describing an association between coordinates on an image which is obtainable by taking an image of the object from a direction parallel to the ground plane and coordinates on the fisheye image.

(Supplementary Note 5)

The image processing device according to any one of Supplementary Notes 1 to 4, further including viewpoint compensation vector generation means for acquiring the roll angle around the optical axis and the pitch angle of the optical axis of the imaging apparatus from an angle sensor attached to the imaging apparatus, and generating the viewpoint compensation vector based on the roll angle and the pitch angle which are acquired.

(Supplementary Note 6)

An image processing method including:

acquiring a fisheye image in which an object is;

acquiring, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and setting a plurality of viewpoints for a converted fisheye image along a horizontal direction of the converted fisheye image, the plurality of viewpoints being parallel to the ground plane, the converted fisheye image being the fisheye image converted using the viewpoint compensation vector, performing a distortion correction by perspective projection approximation on the converted fisheye image based on a coordinate system axes of which include a line of sight from a viewpoint for each of the plurality of viewpoints that are set, and performing image generation of generating a single normalized image using image elements of a vertical direction, the image elements each extracted from corrected fisheye images.

(Supplementary Note 7)

The image processing method according to Supplementary Note 6, wherein the image generation includes setting the viewpoint based on an all pixel number in a horizontal direction of the normalized image to be generated, performing, for each of the plurality of viewpoints, cutting out from the corrected fisheye image in a vertical direction after performing the distortion correction, extracting slice images to each of which a line of sight from a viewpoint enters, arranging the extracted slice images in predetermined order in a horizontal direction, and generating a single normalized image.

(Supplementary Note 8)

The image processing method according to Supplementary Note 6 or 7, wherein the image generation includes determining, in the distortion correction by perspective projection approximation for each of the plurality of viewpoints, a distance of a projection plane to an origin in the coordinate system is determined based on a size of the normalized image to be generated, a range of a viewing angle in a horizontal direction of the normalized image, and an aspect ratio of the normalized image.

(Supplementary Note 9)

The image processing method according to any one of Supplementary Notes 6 to 8, wherein the acquiring the viewpoint compensation vector includes acquiring, as the viewpoint compensation vector, a table describing an association between coordinates on an image that is obtainable by taking an image of the object from a direction parallel to the ground plane and coordinates on the fisheye image is acquired.

(Supplementary Note 10)

The image processing method according to any one of Supplementary Notes 6 to 9, further including acquiring the roll angle around the optical axis and the pitch angle of the optical axis of the imaging apparatus from an angle sensor attached to the imaging apparatus, and calculating the viewpoint compensation vector based on the roll angle and the pitch angle which are acquired.

(Supplementary Note 11)

A storage medium storing a program that causes a computer to execute:

fisheye image acquisition processing of acquiring a fisheye image in which an object is;

viewpoint compensation vector acquisition processing of acquiring, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and image generation processing of setting a plurality of viewpoints for a converted fisheye image along a horizontal direction of the converted fisheye, the plurality of viewpoints being parallel to the ground plane, the converted fisheye image being the fisheye image converted image using the viewpoint compensation vector, performing a distortion correction by perspective projection approximation to the converted fisheye image based on a coordinate system axes of which include a line of sight from a viewpoint for each of the plurality of viewpoints that are set, and generating a single normalized image using image elements of a vertical direction, the image elements each extracted from corrected fisheye images.

(Supplementary Note 12)

The storage medium according to Supplementary Note 11, wherein the image generation processing sets the viewpoint based on an all pixel number in a horizontal direction of the normalized image to be generated, performs, for each of the plurality of viewpoints, cutting out from the corrected fisheye image in a vertical direction after performing the distortion correction, extracts slice images to each of which a line of sight from the viewpoint enters, arranges the extracted slice images in predetermined order in a horizontal direction, and generates the single normalized image.

(Supplementary Note 13)

The storage medium according to Supplementary Note 11 or 12, wherein the image generation processing determines, in the distortion correction by perspective projection approximation for each of the plurality of viewpoints, a distance of a projection plane to an origin in the coordinate system based on a size of the normalized image to be generated, a range of a viewing angle in a horizontal direction of the normalized image, and an aspect ratio of the normalized image.

(Supplementary Note 14)

The storage medium according to any one of Supplementary Notes 11 to 13, wherein the viewpoint compensation vector acquisition processing acquires, as the viewpoint compensation vector, a table describing an association between coordinates on an image that is obtainable by taking an image of the object from a direction parallel to the ground plane and coordinates on the fisheye image is acquired.

(Supplementary Note 15)

The storage medium according to any one of Supplementary Notes 11 to 14, the program further causing a computer to execute:

viewpoint compensation vector generation processing of acquiring the roll angle around the optical axis and the pitch angle of the optical axis of the imaging apparatus from an angle sensor attached to the imaging apparatus, and calculating the viewpoint compensation vector based on the roll angle and the pitch angle which are acquired.

As described above, the present invention has been described with reference to the example embodiments, but the present invention is not limited to the example embodiments described above. Various modifications that can be understood by a person skilled in the art can be made within the scope of the present invention to configurations and details of the present invention.

INDUSTRIAL APPLICABILITY

As described above, according to the present invention, even when a positional relationship between an optical axis of a fisheye camera and a plane to which an object is grounded does not satisfy a certain condition, distortion in the fisheye image can be normalized without influenced by a fisheye optical system. The present invention is useful for various fields in which a fisheye camera is used.

REFERENCE SIGNS LIST

1 Image processing system
10 Image processing device
11 Fisheye image acquisition unit
12 Viewpoint compensation vector acquisition unit
13 Image generating unit
14 Viewpoint compensation vector generation unit
20 Image output device
30 Sensor device
40 Terminal device
110 Computer
111 CPU
112 Main memory
113 Storage device
114 Input interface
115 Display controller
116 Data reader/writer
117 Communication interface
118 Input device
119 Display device
120 Storage medium
121 Bus

The invention claimed is:

1. An image processing device comprising:
a memory that stores a set of instructions; and
at least one processor configured to execute the set of instructions to:
acquire a fisheye image in which an object is;
acquire, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and
set a plurality of viewpoints for a converted fisheye image along a horizontal direction of the converted fisheye image, the plurality of viewpoints being parallel to the ground plane, the converted fisheye image being the fisheye image converted using the viewpoint compensation vector,
perform a distortion correction by perspective projection approximation on the converted fisheye image based on a coordinate system axes of which include a line of sight from a viewpoint for each of the plurality of viewpoints that are set, and
generate a single normalized image using image elements of vertical direction, the image elements each extracted from corrected fisheye images.

2. The image processing device according to claim 1, wherein
the at least one processor is further configured to
set the viewpoint based on an all pixel number in a horizontal direction of the normalized image to be generated,
perform, for each of the plurality of viewpoints, cutting out from the corrected fisheye image in a vertical direction after performing the distortion correction, extract slice images to each of which a line of sight from a viewpoint enters,
arrange the extracted slice images in predetermined order in a horizontal direction, and generate the single normalized image.

3. The image processing device according to claim 1, wherein
the at least one processor is further configured to
determine, in the distortion correction by perspective projection approximation for each of the plurality of viewpoints, a distance of a projection plane to an origin in the coordinate system based on a size of the normalized image to be generated, a range of a viewing angle in a horizontal direction of the normalized image, and an aspect ratio of the normalized image.

4. The image processing device according to claim 1, wherein
the at least one processor is further configured to
acquire, as the viewpoint compensation vector, a table describing an association between coordinates on an image which is obtainable by taking an image of the object from a direction parallel to the ground plane and coordinates on the fisheye image.

5. The image processing device according to claim 1, wherein
the at least one processor is further configured to
acquire the roll angle around the optical axis and the pitch angle of the optical axis of the imaging apparatus from an angle sensor attached to the imaging apparatus, and generate the viewpoint compensation vector based on the roll angle and the pitch angle which are acquired.

6. An image processing method comprising:
acquiring a fisheye image in which an object is;
acquiring, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and
setting a plurality of viewpoints for a converted fisheye image along a horizontal direction of the converted fisheye image, the plurality of viewpoints being parallel to the ground plane, the converted fisheye image being the fisheye image converted using the viewpoint compensation vector,
performing a distortion correction by perspective projection approximation on the converted fisheye image based on a coordinate system axes of which include a line of sight from a viewpoint for each of the plurality of viewpoints that are set, and performing image generation of generating a single normalized image using image elements of a vertical direction, the image elements each extracted from corrected fisheye images.

7. The image processing method according to claim 6, wherein
the image generation includes
setting the viewpoint based on an all pixel number in a horizontal direction of the normalized image to be generated,
performing, for each of the plurality of viewpoints, cutting out from the corrected fisheye image in a vertical direction after performing the distortion correction, extracting slice images to each of which a line of sight from a viewpoint enters,
arranging the extracted slice images in predetermined order in a horizontal direction, and generating a single normalized image.

8. The image processing method according to claim 6, wherein
the image generation includes
determining, in the distortion correction by perspective projection approximation for each of the plurality of viewpoints, a distance of a projection plane to an origin in the coordinate system is determined based on a size of the normalized image to be generated, a range of a viewing angle in a horizontal direction of the normalized image, and an aspect ratio of the normalized image.

9. The image processing method according to claim 6, wherein
the acquiring the viewpoint compensation vector includes acquiring, as the viewpoint compensation vector, a table describing an association between coordinates on an image that is obtainable by taking an image of the object from a direction parallel to the ground plane and coordinates on the fisheye image is acquired.

10. The image processing method according to claim 6, further comprising
acquiring the roll angle around the optical axis and the pitch angle of the optical axis of the imaging apparatus from an angle sensor attached to the imaging apparatus, and calculating the viewpoint compensation vector based on the roll angle and the pitch angle which are acquired.

11. A non-transitory computer readable storage medium storing a program that causes a computer to execute:
fisheye image acquisition processing of acquiring a fisheye image in which an object is;
viewpoint compensation vector acquisition processing of acquiring, based on a roll angle around an optical axis and a pitch angle of the optical axis of an imaging apparatus, a viewpoint compensation vector for converting the fisheye image into an image that is obtainable by taking an image of the object from a direction parallel to a ground plane of the object, the roll angle and the pitch angle being based on a plane parallel to the ground plane of the object; and image generation processing of setting a plurality of viewpoints for a converted fisheye image along a horizontal direction of the converted fisheye, the plurality of viewpoints being parallel to the ground plane, the converted fisheye image being the fisheye image converted image using the viewpoint compensation vector,
performing a distortion correction by perspective projection approximation to the converted fisheye image based on a coordinate system axes of which include a line of sight from a viewpoint for each of the plurality of viewpoints that are set, and
generating a single normalized image using image elements of a vertical direction, the image elements each extracted from corrected fisheye images.

12. The storage medium according to claim 11, wherein the image generation processing
sets the viewpoint based on an all pixel number in a horizontal direction of the normalized image to be generated,
performs, for each of the plurality of viewpoints, cutting out from the corrected fisheye image in a vertical direction after performing the distortion correction, extracts slice images to each of which a line of sight from the viewpoint enters,
arranges the extracted slice images in predetermined order in a horizontal direction, and generates the single normalized image.

13. The storage medium according to claim 11, wherein the image generation processing
determines, in the distortion correction by perspective projection approximation for each of the plurality of viewpoints, a distance of a projection plane to an origin in the coordinate system based on a size of the normalized image to be generated, a range of a viewing angle in a horizontal direction of the normalized image, and an aspect ratio of the normalized image.

14. The storage medium according to claim 11, wherein the viewpoint compensation vector acquisition processing acquires, as the viewpoint compensation vector, a table describing an association between coordinates on an image that is obtainable by taking an image of the object from a direction parallel to the ground plane and coordinates on the fisheye image is acquired.

15. The storage medium according to claim 11, the program further causing a computer to execute:
viewpoint compensation vector generation processing of acquiring the roll angle around the optical axis and the pitch angle of the optical axis of the imaging apparatus from an angle sensor attached to the imaging apparatus, and calculating the viewpoint compensation vector based on the roll angle and the pitch angle which are acquired.

* * * * *

UNITED STATES PATENT AND TRADEMARK OFFICE
CERTIFICATE OF CORRECTION

PATENT NO. : 10,269,092 B2
APPLICATION NO. : 15/753741
DATED : April 23, 2019
INVENTOR(S) : Kosuke Yoshimi It is certified that error appears in the above-identified patent and that said Letters Patent is hereby corrected as shown below:

Column 11, Description of Embodiments, Lines 46-47, [Math 13]; Delete "[α₀,α₁,α₂,α₃,α₄,c,d,e,u₀ᴴ,v₀ᴴ]" and insert -- $[a_0, a_1, a_2, a_3, a_4, c, d, e, u''_o, v''_o]$ -- therefor Signed and Sealed this
Twenty-second Day of October, 2019

Andrei Iancu
*Director of the United States Patent and Trademark Office*